(No Model.) 2 Sheets—Sheet 1.

W. R. MANN.
HAY RAKE.

No. 425,618. Patented Apr. 15, 1890.

Witnesses.
C. C. Burdine
R. W. Bishop

W. R. Mann,
Inventor
By his Attorney.
W. T. Fitzgerald

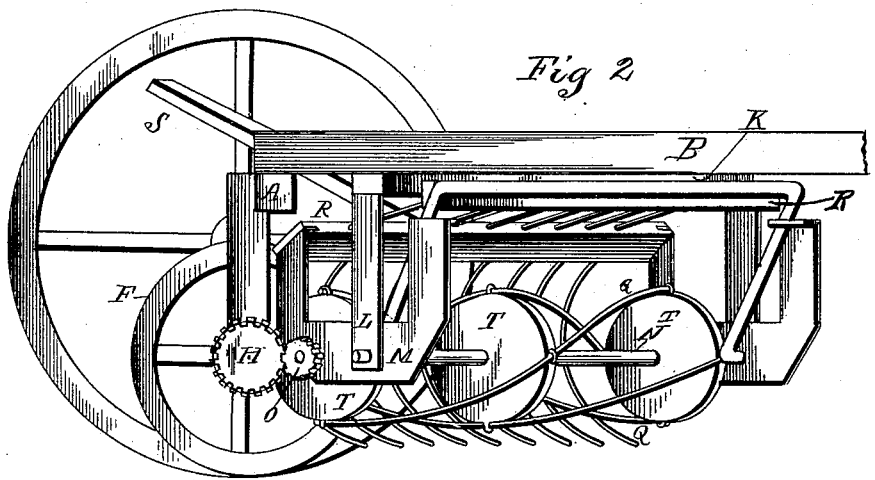
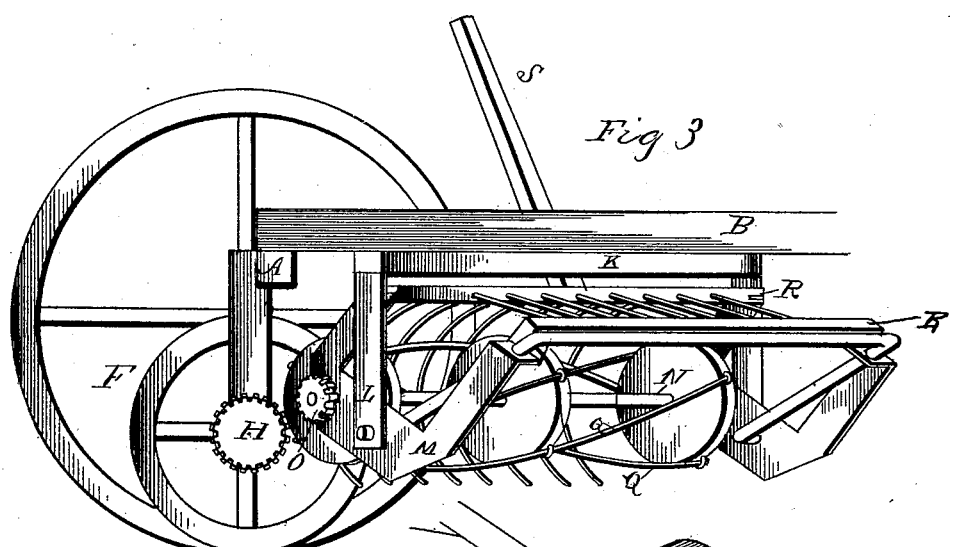
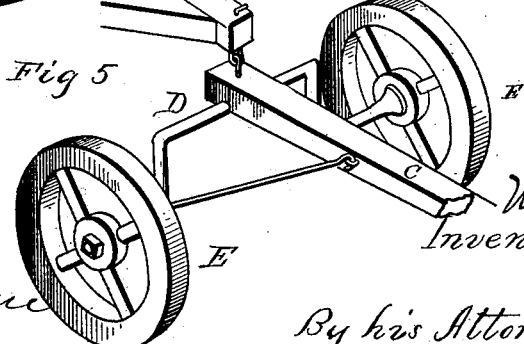

United States Patent Office.

WILLIAM R. MANN, OF EARLVILLE, ILLINOIS, ASSIGNOR OF ONE-FOURTH TO JESSIE R. MANN, OF SAME PLACE.

HAY-RAKE.

SPECIFICATION forming part of Letters Patent No. 425,618, dated April 15, 1890.

Application filed December 10, 1889. Serial No. 333,207. (No model.)

*To all whom it may concern:*

Be it known that I, WILLIAM R. MANN, a citizen of the United States, residing at Earlville, in the county of La Salle and State of Illinois, have invented new and useful Improvements in Hay-Rakes; and I do hereby declare the following to be a full, clear, and exact description of the invention, such as will enable others skilled in the art to which it appertains to make and use the same.

My invention relates to improvements in horse hay-rakes, and has for its object the provision of a rake in which the hay will be raked and delivered at one side in a continuous windrow parallel to the path of the rake by an uninterrupted operation. The invention further aims to provide a hay-rake which will be simple in its construction and will possess a maximum degree of strength. The invention consists in certain novel features hereinafter described and claimed.

Figure 1:
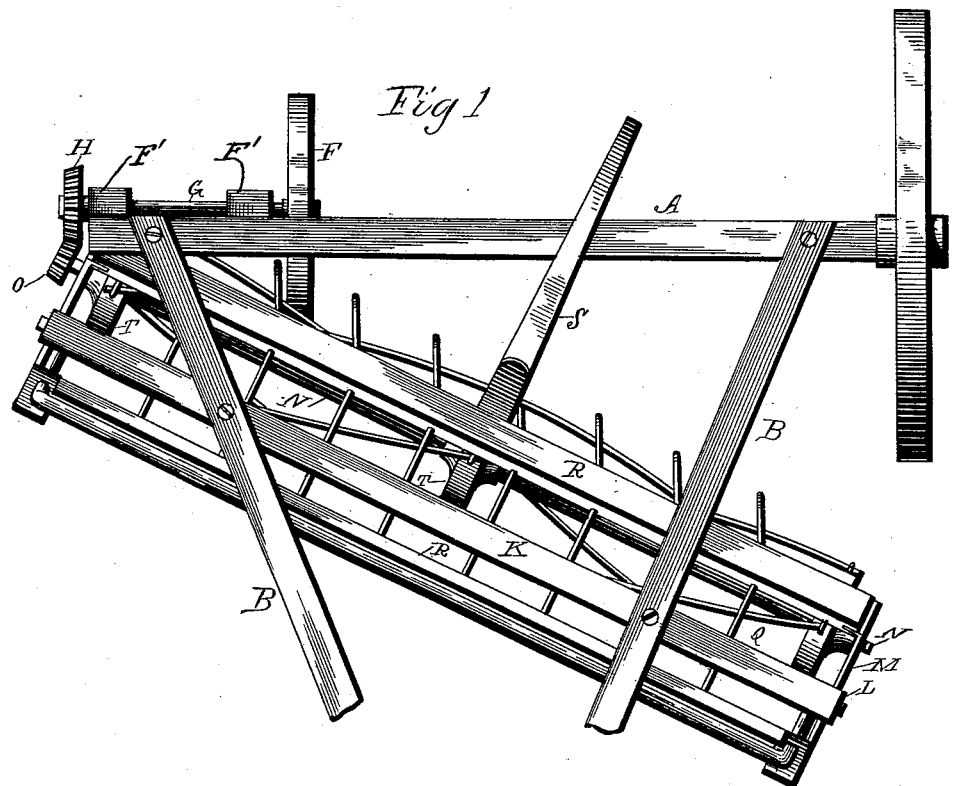
Figure 4:
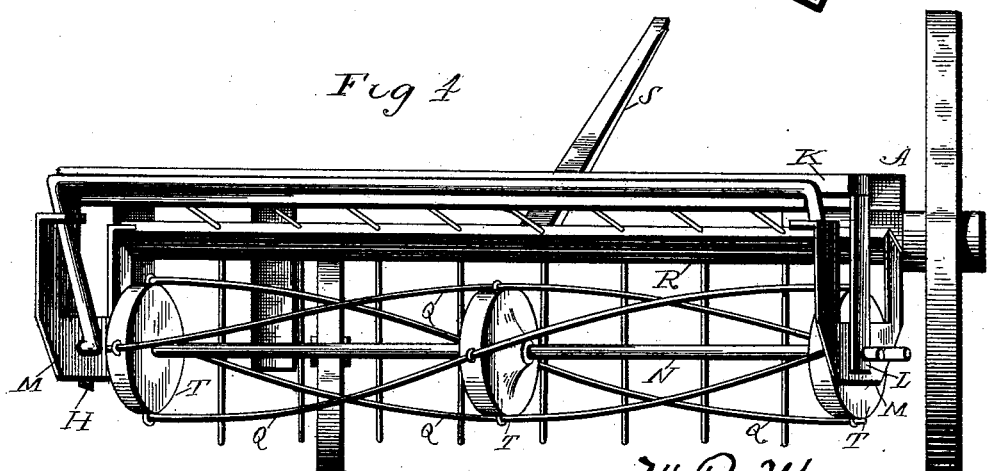

In the annexed drawings, Figure 1 is a plan view of a horse hay-rake constructed in accordance with my invention. Figs. 2 and 3 are side views showing the rake lowered and raised, respectively. Fig. 4 is a front view, and Fig. 5 is a perspective view of the front carrying-wheels and contiguous parts.

Referring to the drawings by letter, A designates the main frame, consisting of axle A and the beams B, secured to the ends of said axle and converging toward their front ends. To the said front ends of these beams I connect the tongue C, to the rear end of which I secure an arched axle D, on the ends of which guiding and carrying wheels E are mounted.

The driving and carrying wheel F is secured rigidly to one end of a shaft G, which is mounted in suitable bearings on posts F', depending from the axle A, and extends along the said axle beneath the same and has a bevel gear-wheel H secured to its free end.

To the under sides of the beams B, in advance of the axle, I secure the supporting-bar K, which is arranged at an angle to the medial longitudinal line of the frame, and is provided with the depending arms L at its ends, as clearly shown. To the lower ends of the arms L, I pivot the U-shaped brackets M, the shoulders of which extend to the opposite sides of the said arms and the arms of which are arranged parallel with the said arms M when the rake is lowered. In the rear corners of these U-shaped brackets I journal the reel-shaft N, one end of which projects beyond the brackets M, and is provided with a bevel-pinion O, adapted to mesh with the bevel gear-wheel H. A series of circular disks T are secured on the reel-shaft and the reel is completed by a number of spiral rods Q, arranged longitudinally and secured to the said disks.

The rake-head is composed of the bars R, secured to and extending between the ends of the U-shaped brackets, and the rake-teeth are secured to the said bars and extend rearward and downward therefrom around the reel in rear of the same, as clearly shown. To the rear bar R, I secure a lever S, which is arranged within convenient reach of the driver, so that the rake and the lever can be easily raised and lowered when so desired. The rear portions of the rake-teeth are circular in side view, so as to pass around the reel, and are arranged parallel with the line of motion of the machine, so as to properly act on the hay, while their upper ends are horizontal and are arranged at right angles to the rake-head, to which they are secured so that they will be effectually braced and enabled to withstand the strain put upon them.

In practice the machine is drawn over the field in the usual manner and the lever S is lowered so as to bring the rake-teeth into position to act upon the hay and throw the pinion O into engagement with the gear-wheel H, so that the reel will be rotated as the machine is drawn along. The rake-teeth will take up the hay and gather the same into a roll, which is acted on by the reel so as to be thrown toward the rear end of the rake, and consequently fed to and beyond the same, so that it will lie on the ground in a continuous windrow parallel to the line of motion of the machine. This action of the reel is greatly facilitated by the spiral rods, which act on the hay at the forward end of the rake first and gradually push the same toward the rear end of the rake, from which it escapes.

It will be observed from the foregoing description that I have provided a very simple and compactly-arranged horse hay-rake, which will have a light draft and which will effectually clear the field and form the hay in a continuous windrow, so that it may be easily gathered and cocked. The hay is prevented from accumulating on the rake-teeth, and thereby unduly straining the same, by the use of the reel, which keeps the teeth clear at all times. The rake and reel occupy but very little room and are easily raised and lowered, so as to be thrown into and out of their operative position, and the machine is at all times supported in a true horizontal position by the front and rear carrying-wheels, the front one, furthermore, permitting the machine to be easily steered and turned. The peculiar formation of the teeth shown and described effects an economy in the room or space required for them, and at the same time gives them the most advantageous form for more effectually acting on the hay without causing their bending or breaking.

Having thus described my invention, what I claim, and desire to secure by Letters Patent, is—

1. The combination, with the frame, of the supporting-bar secured thereto and having depending arms at its ends, the brackets pivoted to said arms, the rake secured to said brackets, the reel mounted in said brackets, and mechanism for rotating the reel, as set forth.

2. The combination, with the frame, of the supporting-bar secured thereto, the swinging brackets carried by said bar, the rake-head secured to said brackets, the reel journaled in the brackets and provided with a pinion at one end, the shaft mounted in the frame and secured to one of the carrying-wheels, and the gear-wheel on the end of said shaft, adapted to mesh with the pinion on the reel, as set forth.

3. The combination, with the rake, of the reel arranged in advance of and adjacent to the teeth of the rake and consisting of a reel-shaft, the series of circular disks secured on said shaft, and a series of spiral rods secured to said disks, as set forth.

In testimony whereof I affix my signature in presence of two witnesses.

WILLIAM R. MANN.

Witnesses:
H. A. CHASE,
J. W. BLISS.